June 10, 1930. J. FRASER 1,763,426
APPARATUS FOR THE MEASURMENT OF LIQUIDS BY VOLUME
Filed Dec. 17, 1925 2 Sheets-Sheet 2
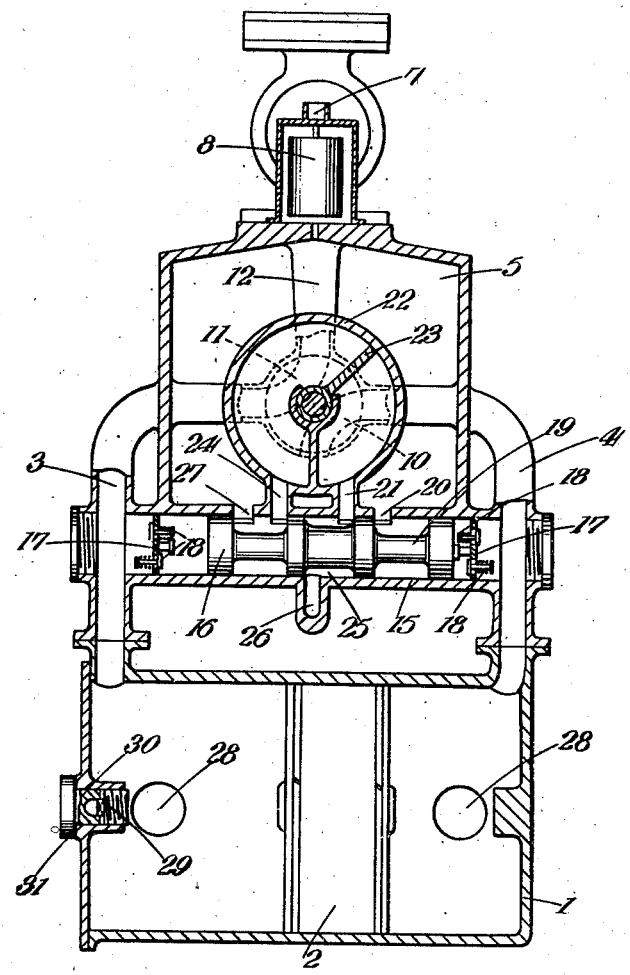
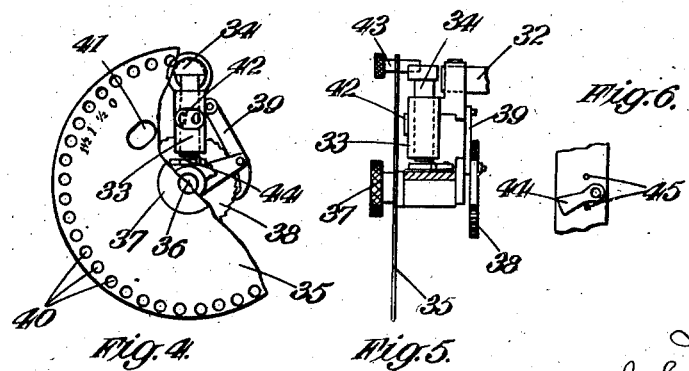

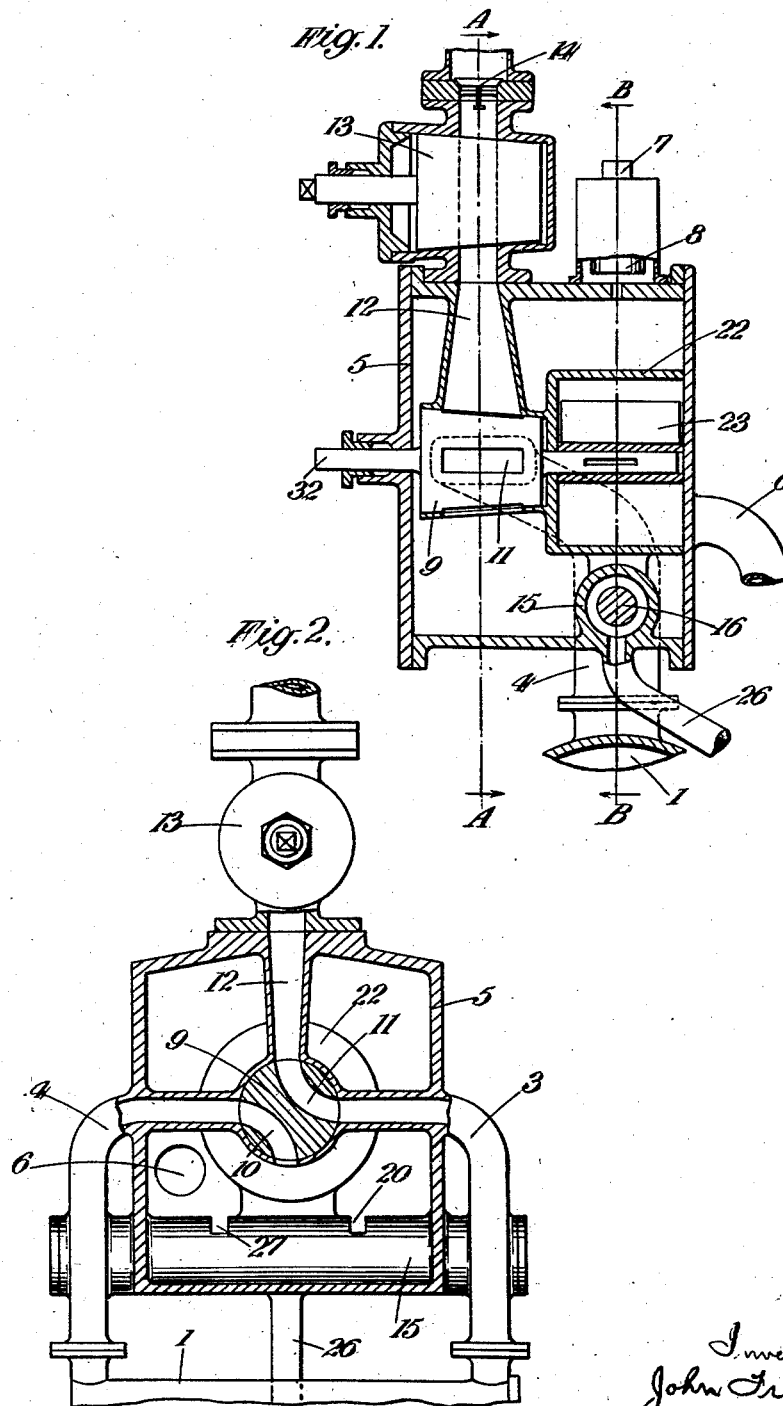

Patented June 10, 1930

1,763,426

UNITED STATES PATENT OFFICE

JOHN FRASER, OF LECKMELM-BY-GARVE, SCOTLAND, ASSIGNOR TO BRITISH PETROLEUM COMPANY, LIMITED, OF LONDON, ENGLAND, A BRITISH COMPANY

APPARATUS FOR THE MEASUREMENT OF LIQUIDS BY VOLUME

Application filed December 17, 1925, Serial No. 76,027, and in Great Britain December 20, 1924.

The present invention relates to apparatus for the measurement of liquids of the type in which one or more spaces of a given capacity is or are successively filled and emptied and is particularly concerned with the provision of improved means for controlling the supply and delivery of the liquid to and from the measuring space or spaces.

The invention consists in liquid measuring apparatus of the type set forth provided with means for controlling the liquid supply to and delivery from the measuring space operated by liquid pressure independent of the pressure in the measuring space but controlled thereby through the medium of means distinct from the measuring device proper and actuated by the pressure in the measuring space.

The invention is especially useful in connection with measuring apparatus comprising a cylinder in which a piston is adapted to reciprocate, and in its application thereto, supply and delivery of the liquid to and from the ends of the cylinder is controlled by means operated by liquid pressure independent of that in the cylinder but controlled by a relay valve actuated by said cylinder pressure.

In order that the invention may be clearly understood and readily carried into effect, it will be described by way of example in its application to a cylinder and piston measuring apparatus suitable for use with petrol and like spirit, such an apparatus being illustrated in the accompanying drawings, in which:—

Figure 1 is a central longitudinal section of the apparatus.

Figure 2 is a view looking from the front of the apparatus, the upper part being in outside elevation and the lower part being a section on the line A, A of Figure 1, Figure 3 is a section on the line B, B of Figure 1 looking from the back of the apparatus, Figure 4 represents in front elevation mechanism for predetermining the amount of liquid to be delivered, a portion of the apparatus being however, broken away, Figure 5 is a side view of the mechanism depicted in Figure 4, and, Figure 6 is a plan view of a detail.

The measuring cylinder 1, is fitted with a freely moving piston 2, adapted to be reciprocated by liquid pressure introduced to the ends of the cylinder by pipes 3 and 4, from a chest 5. Liquid is supplied under pressure to this chest by such means as a pipe 6, and the chest is fitted with an air vent 7 adapted to be closed by a float valve 8 when the chest is filled with liquid. Such a chest is advantageous in preventing a possible emptying of the portions of the apparatus which determine the measurement should there be a leak in the non-return valve which would normally be fitted in the pipe 6. Admission of liquid from the chest 5 to the cylinder 1, through either of the pipes 3 or 4, is controlled by a cock 9, having passages 10 and 11. When the cock is in the position indicated in Figures 2 and 3 the pipe 4 is in communication with the chest 5 through the passage 10 and pressure is accordingly acting on the right hand face of the piston 2, considered as seen in Figure 3. The piston is thus forced towards the left, the liquid which has previously been supplied to that end of the cylinder 1 finding its escape through the pipe 3 and the passage 11 of the cock 9 to a delivery pipe 12, this being preferably fitted with a cut off cock 13, and non-return valve 14.

A second cylinder 15, the ends of which also communicate with the pipes 3 and 4, is fitted with a piston or auxiliary valve 16 the combination operating as a relay valve. The ends of this cylinder are closed by partitions 17 each provided with a pair of spring-controlled non-return valves 18. The valves in each partition are opposed in position so that one valve will allow the liquid to pass in one direction and the other valve in the other direction. The strength of the springs fitted to these valves is such that, so long as the piston 2 is moving in its cylinder under pressure of the liquid in the chest 5, the valves 18 remain closed, but when the piston 2 is arrested at either end of its stroke the rise of pressure in the corresponding pipe 3 or 4 is sufficient to open one of the valves 18. In the case depicted in Figure 3 in which, as above mentioned, the piston 2 is moving toward the left, when it has completed its stroke the rise in pressure in the pipe 4 operates to open the lower valve 18 in the partition at the right hand end of the cylinder 15. Liquid under pressure is thus admitted to the cylinder 15 and acts on the piston 16 thereby impelling it through the length of its stroke toward the left hand end of the cylinder, the liquid already in that end being expelled through one of the valves 18 in the left hand partition 17. On account of the annular space surrounding a reduced portion 19 of the piston 16, this motion results in a port 20 in the chest 5 being connected with a port 21 leading to a cylindrical casing 22. The spindle of the cock 9 extends through this casing and is provided with a vane 23 fitted to oscillate in the casing 22 in a fluid tight manner. Admission of liquid under pressure through the port 21 serves to oscillate the vane 23, the liquid on the left hand side thereof, regarding the view of it shown in Figure 3, escaping through a port 24 and an annular space 25 to the exhaust pipe 26 which may conveniently lead back to the tank or other source of supply of the liquid. The cock 9 is thus oscillated through a right-angle thereby serving to reverse the connections of the pipes 3 and 4; the pipe 3, now being connected with the chest 5, becomes the supply pipe to the cylinder 1 resulting in reversal of the motion of the piston 2, while delivery of the liquid from the cylinder takes place through the pipe 4, passage 10 and delivery pipe 12. This action continues, until the piston 2 reaches the right hand end of the cylinder 1, regarded as seen in Figure 3 when a rise of pressure occurs in the pipe 3 thus moving the piston 16 to connect the ports 24 and 27 and the port 21 with the exhaust pipe 26, so that the vane 23 and the cock 9 are oscillated back to the position shown in the drawings and the cycle of operations is then repeated. If the piston 16 be so fitted to its cylinder that its resistance to movement under the action of liquid pressure is greater than that of the piston 2 to an extent which will ensure that it will not move until the piston 2 has completed its stroke, the partitions 17 and valves 18 may be dispensed with, but their use as indicated is preferred as ensuring a more certain result in action.

In order to ensure that the piston 2 is performing its complete stroke, windows 28 to permit of observation are fitted in the cylinder 1, and the length of the stroke and, therefore, the measuring capacity of the apparatus is adjustable by means of a screw plug 29 on the outside of which is fitted a second screw plug 30 adapted to bear in a liquid tight manner, by means of a suitable packing 31, on the outside end of the cylinder 1.

In order to predetermine the amount of liquid which can be delivered, the device illustrated in Figure 4 may be employed. The spindle 32 of the cock 9 is fitted with an arm 33 which takes the form of a socket in which a plunger 34 may slide, being urged in an upward direction by a spring not shown. A disc 35 is fitted on a spindle 36 and may be turned by such means as a milled nut 37; a ratchet wheel 38 is also fitted to the spindle 36 and is adapted to be operated by a pawl 39 pivoted on the arm 33. The disc 35 is formed with a series of holes 40 suitably graduated in quantities such for example as half-gallons as indicated, multiples of which it is desired to measure, these graduations corresponding to the quantity of liquid delivered by each single stroke of the piston 2. It will be seen, that, as the cock 9 oscillates, the pawl 39 is operated to rotate the disc 35, and the mechanism is so designed that the disc is rotated through an angle equal to the pitch of the holes 40 at every stroke of the piston 2. In use, the disc 35 is turned by the milled nut 37 so as to bring the zero mark opposite the centre of the plunger 34, which is in a vertical position so that the passages 10 and 11 in the cock 9 are both entirely closed. In this position of the disc 35, an aperture 41 is opposite a tablet 42 on the arm 33 bearing the word "Go" or some other appropriate inscription to indicate that the apparatus is in a correct position to start delivery of any measured quantity desired, that is that the piston 2 is at one end of its stroke. A peg 43 is then placed in one of the holes 40 corresponding with the amount which is desired to be delivered, and, on pressure then being applied to the liquid in the chest 5 by such means for example as the operation of a pump to deliver liquid through the pipe 6, liquid under pressure will find its way from the chest 5 into the casing 22, either through the ports 20 and 21 or through the ports 27 and 24, and the cock will thus be rocked by means of the vane 23 to connect its passages with the pipes 3 and 4. Since the arm 33 oscillates with the cock 9, on reversal of the latter the disc 35 is turned through an angle corresponding to that between consecutive holes 40 on each stroke of the piston 2, and when the peg 43 encounters the rounded upper surface of the plunger 34 it serves to depress it, so that its lower end is brought into contact with a pivoted stop 44, the possible motion of this stop being determined by two pins 45, so placed that when the stop 44 is encountered by the plunger 34, the oscillatory motion of the latter, and, therefore, of the arm 33, is arrested in the central position; the passages 10 and 11 in the cock 9 are thereby closed and further delivery of the liquid is therefore impossible, until the disc 35 has been moved by hand to liberate the plunger 34. Instead of employing a peg, 43, to depress the plunger 34 at the required moment, a push-button or like device may be arranged to perform this operation at any desired moment so that actuation of the apparatus will be stopped when the piston 2 has completed the stroke in progress when the push-button or like device was operated. It will be seen that the apparatus described for predetermining the amount of liquid required to be delivered may also be used to prevent more than a certain total amount being passed through the apparatus. To this end a peg similar to the peg 43 would be placed in one of the holes 40, or in one of a second series of holes, representing the total amount to be delivered, and a suitable locking device to retain the peg in this position may be provided. This peg would be so arranged that, in depressing the plunger 34, the discs 35 becomes locked against movement by hand.

The above described construction illustrates several advantages which arise out of the improved apparatus in accordance with this invention for example, since the liquid employed to move the vane 23 forms no part of the delivered measured quantity, a relatively large volume may be used for this purpose thus enabling a comparatively stiffly-moving device such as a plug cock to be utilized, this being in practice a more satisfactory form of valve for the purpose than a slide valve or its equivalent. Further, as leakage of this liquid is immaterial from the point of view of accuracy of measurement, it is not necessary that the intermediate plungers at each end of the space 25 should be an absolutely liquid-proof fit in the cylinder 15, with the result that the piston 16 may be made to move in this cylinder with the minimum of resistance and thus complete its stroke even if only a small force be applied; also, for the same reason, the diameter of the piston 16 may be kept small so that, even if the stroke be not completed, the resulting error is minimized.

What I claim and desire to secure by Letters Patent of the United States is:—

1. Liquid-measuring apparatus comprising in combination a cylinder, a piston in said cylinder, means whereby liquid may be admitted to and discharged from each end of said cylinder, a valve controlling said means, mechanism responsive to liquid pressure to actuate said valve, an auxiliary valve-means whereby liquid under pressure is admitted to and discharged from said mechanism, said auxiliary valve-means being operated by liquid pressure, and means for preventing actuation of said auxiliary valve until said piston is in contact with one end of said cylinder.

2. Liquid-measuring apparatus comprising in combination a cylinder, a piston in said cylinder, means whereby liquid may be admitted to and discharged from each end of said cylinder, a valve controlling said means, a vane operatively connected to said valve, a casing enclosing said vane in a fluid-tight manner, an auxiliary valve-means whereby liquid under pressure is admitted to and discharged from said casing, said auxiliary valve-means being operated by liquid pressure, and means for preventing actuation of said auxiliary valve until said piston is in contact with one end of said cylinder.

3. Liquid-measuring apparatus comprising in combination a cylinder, a piston in said cylinder, means whereby liquid may be admitted to and discharged from each end of said cylinder, a valve controlling said means, mechanism responsive to liquid pressure to actuate said valve, a second cylinder, a piston valve in said cylinder, a source of supply of liquid under pressure, an exhaust means for liquid, said second mentioned cylinder having ports connecting said cylinder with said source of supply and ports connecting said cylinder with said mechanism, there being portions of reduced diameter in said piston valve so located as to provide communication between said second mentioned ports and either said first mentioned ports or said exhaust means, whereby said mechanism may be connected with said source of supply or with said exhaust means and means for placing opposite ends of said second mentioned cylinder respectively in operative connection with opposite ends of said first mentioned cylinder.

4. Liquid-measuring apparatus comprising in combination a cylinder, a piston in said cylinder, means whereby liquid may be admitted to and discharged from each end of said cylinder, a valve controlling said means, mechanism responsive to liquid pressure to actuate said valve, a second cylinder, a piston valve in said cylinder, a source of supply of liquid under pressure, an exhaust means for liquid, said second mentioned cylinder having ports connecting said cylinder with said source of supply and ports connecting said cylinder with said mechanism, there being portions of reduced diameter in said piston valve so located as to provide communication between said second mentioned ports and either said first mentioned ports or said exhaust means, whereby said mechanism may be connected with said source of supply or with said exhaust means, means for placing opposite ends of said second mentioned cylinder respectively in operative connection with opposite ends of said first mentioned cylinder, a partition in proximity to each end of said second mentioned cylinder, a non-return valve in each partition arranged to permit passage of fluid in one direction and a second non-return valve in each partition arranged to permit passage of fluid in the opposite direction.

5. Liquid-measuring apparatus, comprising in combination a cylinder, a piston in said cylinder, means whereby liquid may be admitted to and discharged from each end of said cylinder, a valve controlling said means, mechanism responsive to liquid pressure to actuate said valve, an auxiliary valve whereby liquid under pressure is admitted to and discharged from said mechanism and having a port leading to exhaust, said auxiliary valve means being operated by liquid pressure, means for preventing actuation of said auxiliary valve until said piston is in contact with one end of said cylinder, a fluid-tight chest enclosing said controlling valve said actuating mechanism and said auxiliary valve, said chest having an air vent therein and having ports connecting said chest respectively with said controlling valve and with said auxiliary valve, and a float valve adapted to cooperate with said vent whereby said vent is closed when said chest is full of liquid.

6. Liquid-measuring apparatus comprising in combination, a cylinder, a piston in said cylinder, means whereby liquid may be admitted to and discharged from each end of said cylinder, a valve controlling said means, mechanism responsive to liquid pressure to actuate said valve, an auxiliary valve-means whereby liquid under pressure is admitted to and discharged from said mechanism, said auxiliary valve-means being operated by liquid pressure, means for preventing actuation of said auxiliary valve means until said piston is in contact with one end of said cylinder, and means enabling the operator to ascertain that at the commencement of the operation of the apparatus said piston is in contact with one end of said cylinder.

JOHN FRASER.